United States Patent Office 3,368,982
Patented Feb. 13, 1968

3,368,982
NICKEL AND NICKEL OXIDE CATALYSTS ON A NICKEL SPINEL BASE
Charles Gordon Milbourne, Lansdowne, Pa., assignor to United Engineers & Constructors Inc., Philadelphia, Pa., a corporation of Delaware
No Drawing. Filed Mar. 9, 1964, Ser. No. 350,520
7 Claims. (Cl. 252—466)

ABSTRACT OF THE DISCLOSURE

A nickel-impregnated alumina body is heated to a temperature of at least 1900° F. in an oxygen-containing atmosphere until at least the surfaces of the alumina particles in the outer periphery of the body have been converted to nickel spinel, and the resulting body is hereafter impregnated with nickel salt which is decomposed to provide, on the nickel spinel, a film of catalytically active nickel or nickel oxide. In the resulting catalyst body, the outer periphery consists essentially of particles at least the surfaces of which consist of nickel spinel, said particles additionally having thereon a film of catalytically active nickel or nickel oxide. The catalyst is primarily useful in cyclic processes employing massive, stationary catalyst zones subjected to high temperatures and oxygen-containing gas.

---

The present invention relates to an improved process for the cyclic catalytic conversion of hydrocarbon in the presence of steam into a gas comprising hydrogen and carbon monoxide, including gaseous hydrocarbons, if desired, and to a novel catalyst for use therein; and, more particularly the present invention relates to a novel cyclic catalytic process of the stated type wherein a nickel-containing catalyst is employed and wherein, in spite of its being subjected to strongly oxidizing conditions at high temperatures, the catalyst retains its catalytic activity over long periods of time.

In the cyclic catalytic reforming of hydrocarbons with steam to produce a product gas comprising carbon monoxide and hydrogen, and also gaseous hydrocarbons, wherein the nickel catalyst is in a stationary zone and wherein, in one portion of the cycle, the catalyst zone is heated in part by passing hot, oxygen-containing gases therethrough, and, in the other portion of the cycle, reformation takes place by passing the hydrocarbon in the vapor state and steam through the catalyst zone, the catalyst is subjected to oxidizing conditions at high temperatures for prolonged periods of time. It is believed that these conditions contribute to or cause the decline in the activity of the catalyst which has been experienced and which has been noted in, for example, The Institute of Gas Technology, Bulletin No. 26, March 1960.

In the process described in U.S. Patent 2,759,805, a catalyst oxidation-reduction-combustion sequence is resorted to, to supply a portion of the heat to the stationary catalyst zone. In accordance with that process, during a portion of the cycle other than the reforming portion, nickel in the catalyst is oxidized by passing oxygen-containing gas into and through the catalyst zone. This oxidation generates heat within the catalyst mass itself. Still at a portion of the cycle other than the reforming portion and after the oxidation step, an oxidizable reducing gas is passed into and through the catalyst zone reducing the oxide to highly active elemental form with the simultaneous combustion of the oxidizable gas by virtue of the oxygen liberated by the nickel oxide. This subsequent reduction of the nickel oxide requires heat; and, theoretically the amount of heat required for the reduction is the same as, and offsets that generated by, the oxidation of the nickel. However, the heat required for reduction of the nickel oxide is approximately offset by the heat generated by the simultaneous oxidation (combustion) of the oxidizable reducing gas passing through the catalyst zone. The net result is the storage of heat in the catalyst mass, the net heat generated being substantially equivalent to that caused by oxidation of the catalyst. In addition, a portion of the heat necessary to maintain the cyclic operation is provided by passing hot combustion products through the catalyst zone, and it is heat obtained from such hot gases in conjunction with the net heat stored during the above-mentioned oxidation-reduction-combustion sequence that produces the total heat requirements of the process of that patent. The stored heat is utilized during the subsequent endothermic portion of the cycle wherein the hydrocarbon is reformed in the presence of steam. In such operation, however, the decline in the activity of the nickel catalyst is most markedly apparent due, presumably, to the highly oxidizing conditions employed during the heat storage portion of the cycle. This decline becomes even more aggravated when high pressures are used during the cycle since increased pressure increases the oxidizing ability of oxygen-containing gases. This decline is also aggravated by increasing temperatures such as are required when a product gas low in hydrocarbons, like ammonia synthesis gas and certain combustible gases, is desired.

The cyclic catalytic reforming procedure is to be distinguished from continuous processes conducted in tubes. In the latter, the catalyst is not heated directly by passing hot gases therethrough only indirectly by conduction through the walls of the tubes, and only the reactants—never any oxygen-containing gas—contact the catalyst. Hence in continuous tubular processes the strenuous oxidizing conditions referred to above are not encountered.

Conventional nickel-containing catalysts heretofore used in hydrocarbon reforming processes, whether cyclic or continuous, were prepared by impregnating preformed shapes, e.g. spheres, of alumina with an aqueous nickel salt solution, drying and calcining. Calcining converted the nickel salt to nickel oxide which was reduced to nickel prior to use or in situ by the first portions of hydrocarbon passed through the catalyst zone. However, it is in cyclic processes where this catalyst rapidly loses its activity, and it is, therefore, the improvement of the cyclic catalytic process to which the present invention is directed.

It is the principal object of the present invention to provide an improved method for the cyclic catalytic reforming of hydrocarbons with steam into a gas comprising hydrogen and carbon monoxide.

It is a further object of the present invention to provide a process for the cyclic catalytic reforming of hydrocarbons with steam into a gas comprising hydrogen and carbon monoxide wherein the catalyst is subjected to highly oxidizing conditions but, nevertheless, maintains its catalytic activity over long periods of use.

It is another object of the present invention to provide an improved nickel-containing catalyst which has a much greater useful catalyst life in cyclic procedures under strongly oxidizing conditions than the nickel-containing catalysts presently available.

Other objects, including the provision of a method for making the novel catalyst of the present invention, will become apparent from a consideration of the specification and claims.

The novel cyclic process of the present invention involves, in the alternate heating of a massive, stationary zone of nickel-containing catalyst bodies by passing hot gases, including oxygen-containing gases, therethrough and utilizing said catalyst zone, with said nickel in elemental forms, and the heat stored therein to reform a hydrocarbon in the presence of steam into a gas comprising hydrogen and carbon monoxide, the improvement which comprises employing as nickel-containing catalyst essentially alumina bodies in which the outer periphery of each body consists of particles at least the outer surfaces of which consist essentially of a spinel selected from the group consisting of nickel spinel and magnesium spinel said spinel-containing particles having additionally a film of nickel thereon.

It has been determined according to U.S. Patent No. 2,828,196, that the catalytically active portion of nickel-impregnated alumina spheres having a diameter between about ¼ and about 3 inches, or equivalent shapes having masses equivalent to such spheres, and a porosity between about 30 and about 40%, is in the outer approximately $\frac{1}{32}$–$\frac{1}{16}$ of an inch. In accordance with the present invention, the catalyst used consists essentially, in the outer approximately $\frac{1}{32}$–$\frac{1}{16}$ inch of the periphery, of particles at least the surface of which consists of nickel- or magnesium spinel on which particles is additionally coated the catalytic nickel or nickel oxide. Thus, at the site of catalytic activity, the alumina in contact with the catalytically active nickel is already satisfied, by being combined with magnesium or nickel, so that no further reaction between the subsequently applied catalytically active nickel and alumina can take place. In this connection, it is believed that the decline in the activity of conventional nickel-impregnated alumina catalysts is due principally to a reaction between the nickel and the alumina. At any rate, in the process of the present invention the catalyst will have a useful catalytic life substantially greater than that of conventional nickel-impregnated alumina catalysts. This is particularly so under highly oxidizing, high-temperature conditions, such as the process of Patent 2,759,805, and under high pressure conditions wherein the pressure accentuates the effect of oxygen in the oxygen-containing gases in deactivating the nickel catalyst at high temperatures.

In accordance with the preferred embodiment of the invention, the catalyst employed will be one in which the stated spinel is nickel spinel. In preparing the catalyst, preformed alumina bodies are impregnated with an aqueous solution of a water-soluble nickel salt, such as nickel nitrate. The alumina bodies may be in the form of spheres, lumps, cubes, cylinders and the like, having an average mass equivalent to that of spheres having a diameter of between about ¼ and about 3 inches. To the foregoing extent, the initial stages of the preparation of the present catalyst need be no different from the procedures and techniques employed in preparing conventional nickel-impregnated catalysts. However, in accordance with the present invention, the nickel-impregnated alumina bodies must be subjected to conditions under which the nickel or nickel oxide is caused to react with the alumina in the outer periphery of the catalyst bodies, at least to the depth of approximately $\frac{1}{32}$–$\frac{1}{16}$ of an inch. This reaction requires high temperatures, oxidizing conditions and a relatively long period of time. With respect to the temperature, it has been found that the temperature should be at least about 1900° F. Temperatures substantially above this, such as up to 2500° F. may be employed; however, since temperatures below this will be satisfactory, there is generally no need to exceed about 2100° F. The oxidizing conditions are provided by passing, through the catalyst zone, air or combustion products produced by burning a fuel in the presence of excess air, or a combination of these means. In a preferred procedure, hot combustion products, which may or may not contain excess air, are passed through the catalyst bed to heat it to approximately 2000–2100° F., following which air is passed through the catalyst bed until the temperature drops to about 1900° F. This sequence is repeated over a period of about 24 hours. Obviously, the exact time required will depend upon the temperature and oxidizing conditions employed as well as upon the exact nature of the catalyst.

In any event, the object of the treatment is, as stated, to convert the mixed alumina and nickel or nickel oxide to nickel spinel ($NiO \cdot Al_2O_3$—$NiO \cdot 1.5Al_2O_3$) at least in the surfaces of the alumina particles in the outer periphery of each catalyst body at least to a depth of approximately $\frac{1}{32}$–$\frac{1}{16}$ of an inch. The core of each catalyst body will remain esesntially alumina; that is it will be primarily the original alumina plus original nickel salt which, however, has no function. While complete conversion of the alumina in the outer periphery of the bodies to spinel form can be achieved, if desired, it requires a substantial quantity of nickel (from about 26 to about 33%, by weight, of nickel based on the combined weight of $NiO$ and $Al_2O_3$ in the periphery) and such expendient is unnecessary so long as the surfaces of the alumina particles are converted to spinel thereby effectively insulating the unreacted alumina inside the particles from reaction with the subsequently applied catalytically active nickel. Nickel in excess of that required to form the spinel should not be used. Conversion of the nickel and alumina to spinel form can be determined by attempting to leach out soluble nickel through the use of an aqueous acid solution. The nickel spinel is not soluble. The nickel reacted with the alumina to form the nickel spinel has greatly reduced catalytic activity, and this phase of the procedure is to provide a catalyst base which is no longer reactive with nickel under the strongly oxidizing conditions referred to.

In forming magnesium spinel instead of nickel spinel, the procedure is the same as that described above except that a magnesium salt is employed in impregnating the alumina bodies.

Once spinel formation has been completed, the catalyst bodies are impregnated with an aqueous solution of a water-soluble nickel salt, such as the nitrate, dried and then calcined as in conventional nickel catalyst preparation procedures. In this connection, the catalyst base prepared as described in the preceding paragraphs, may be soaked in an aqueous solution of the nickel salt until most of the air bubbles are expelled from the pores of the bodies. After impregnation, the catalyst bodies may be dried, as by heating to a temperature above the boiling point of water and up to about 400° F. Impregnation may be repeated followed by further drying, and this impregnation-drying sequence may be repeated several times to insure the desired concentration of nickel in the catalyst. Since, as stated, the principal site of catalyst activity is in the outer periphery, it is the conventration of nickel in the outer periphery, in the first approximately $\frac{1}{32}$–$\frac{1}{16}$ inch layer, that is to be considered. The concentration of active nickel, the nickel over and above that reacted with the alumina in the nickel-spinel, should be between about 2% and about 15%, preferably between about 5% and about 10%.

After impregnation and drying, the catalyst will be calcined simply to decompose the nickel salt. Upon decomposition of the nickel salt, the nickel, either in the form of metallic nickel or nickel oxide, is in a form ready for use.

The porosity of the catalyst bodies of the present invention should be between about 25% and about 60%, preferably between about 35% and about 45%.

Cyclic catalytic reforming procedures involve the use, as stated, of a stationary zone of catalyst through which, in one portion of the cycle, heating gases are flowed until the catalyst zone has reached the requisite temperature, and through which, in another portion of the cycle, the reactants (hydrocarbon vapors and steam) are passed for carrying out the endothermic catalytic reformation reaction. In the heating portion of the cycle, the temperature of the catalyst zone will be raised to a level dictated largely, as well known to those skilled in the art, by various factors including the nature of the hydrocarbon, flow rate of reactants, and the like. When natural gas is employed as the hydrocarbon reactant, for example, the average temperature of the catalyst zone should be at least about 1500° F. When a hydrocarbon heavier than methane is employed as a reactant, it may be desirable to provide a somewhat lower average temperature in the catalyst zone during the heating step, and in some cases an average temperature as low as about 1200° F. may be sufficient. Generally, temperatures in excess of about 2500° F. are not used, and, preferably, the catalyst zone is not heated above about 2100° F.

As stated, the present catalyst is particularly suitable for use in the process described in U.S. Patent 2,759,805. According to the process of that patent a portion of the required heat is stored cyclically in the catalyst mass by the passage into the hot catalyst mass of a controlled amount of free oxygen to convert catalytically active nickel to oxidized form with the generation of heat. This increases the temperature of the exit portion of the catalyst zone without overheating the entrance portion of the catalyst zone. The heat so stored is not dissipated by the subsequent passage of a reducing gas through the oxidized catalyst zone to reduce the nickel oxide to a highly, catalytically active elemental form for the reformation portion of the cycle. Thus, the storage of heat in this manner, in conjunction with the passage of hot gases through the catalyst zone, results in a reduced temperature gradient through the catalyst zone as compared to the temperature gradient produced by heating the catalyst zone solely by passing hot gases therethrough without the stated oxidation-reduction-combustion sequence. In accordance with that process, therefore, at a step in the cycle other than the actual reformation reaction portion thereof, a controlled amount of free oxygen is passed into the catalyst zone converting nickel to oxide form with the generation of heat, and then an oxidizable reducing gas is passed into the catalyst zone converting the nickel oxide to metallic nickel with the simultaneous oxidation of the oxidizable gas. Following the desired storage of heat in the catalyst zone, and the reduction of the nickel oxide to elemental form, the reformation reaction portion of the cycle is effected by passing the hydrocarbon in the gaseous state and steam through the hot catalyst zone where catalytic reaction with the utilization of heat occurs. All materials passed through the catalyst zone during the entire cycle are passed in the same direction.

The above-described process has the significant advantages of providing a more even temperature gradient over the catalyst zone than is the case when the catalyst zone is heated simply by passing hot gasses therethrough. This reduction of the temperature gradient means that the temperature of the outlet portion of the catalyst zone more closely approaches that of the inlet portion. This in turn means that in reforming hydrocarbons, for example, residual, unreformed hydrocarbon in the reaction gases passing through the outlet portion of the catalyst zone can be more completely reformed and/or that the catalyst zone has a greater gas making capacity. In addition, oxidizing the nickel to provide a source of heat is a more efficient means of heating the catalyst mass than solely by means of hot gases passing therethrough.

The process of said U.S. Patent 2,759,805 and hence of a preferred embodiment of the present invention, involves the use of a massive stationary bed of catalyst material. By "massive" is meant a relatively deep bed or beds of catalyst material, for example, at least about two feet in depth and having a substantial diameter of at least about two feet. The maximum depth of the catalyst zone is relatively unimportant and is governed by economical and engineering design considerations. Generally, however, the catalyst zone depth is not over about twelve feet, with the process being particularly applicable to catalyst zones having a depth between about three and about five feet. By "stationary" is meant that the catalyst material remains at rest and that the position of each catalytic body is more or less fixed with respect to the others as distinguished from fluidized processes.

As stated, part of the heat requirements of the process are provided by passage of hot gases through the catalyst zone which supply heat through transmission of sensible heat from the hot gases to the catalyst mass. This passage of hot gases through the catalyst zone follows conventional procedure in a cyclic process wherein a fuel is burned and the resulting hot combustion products are passed through the catalyst zone.

With respect to the passage of free oxygen through the catalyst zone to oxidize nickel, such free oxygen may be passed through the catalyst zone at any time during the cycle other than the endothermic reaction step, and, of course, at a time prior to the reduction-combustion-step wherein nickel oxide is reduced to elemental nickel form. The passage of free oxygen through the catalyst zone may be accomplished by a wide variety of procedures, the important feature being only the total amount of free oxygen per cycle passed through the catalyst zone on the basis more fully described hereinafter. Thus the passage of free oxygen may be a step separate and distinct from the passage of the hot combustion product gases through the catalyst zone. In other words, air, or other oxygen-containing gas by itself or in admixture with another gas, such as steam may be passed through the catalyst zone before or after, or at some intermediate point in the heating portion of the cycle during which hot combustion products are passed through the catalyst zone. On the other hand, the free oxygen may be passed through the catalyst zone in conjunction with the passage of the hot combustion products therethrough. For example, free oxygen may be passed through the catalyst zone during any portion or all of that period during the heating portion of the cycle during which the hot combustion products are passed through the catalyst zone. A convenient method of providing free oxygen in such procedure is to burn the fuel during the production of the hot combustion products in the presence of a controlled excess of air so that the products of combustion passing through the catalyst zone will contain a controlled amount of free oxygen.

As stated, before the actual endothermic portion of the cycle, e.g. the reforming step of the hydrocarbon reforming cycle, can take place, the oxidized catalyst must be reduced to the elemental form and this is accomplished by the passage of oxidizable reducing gases through the catalyst zone at a point in the cycle after the oxidation of the catalyst and before the endothermic reaction portion of the cycle. This reduction of the catalyst nickel oxide to elemental form is accomplished simultaneously with the combustion of the oxidizable gases by virture of the oxygen released by the nickel oxide. The oxidizable gases passed through the oxidized catalyst zone may be selected from a wide variety of gaseous materials, the only requirement being that they unite readily with oxygen of the nickel oxide under the temperature conditions obtaining. Examples of such gases are hydrogen, carbon monoxide, vaporized hydrocarbons, and the like. Mixtures of two or more such gases may be employed, if desired, and, as is often the case, mixture of such gases with other, inert, gases, such as nitrogen, carbon dioxide and the like, may be used. A gas comprising oxidizable gases may conveniently be produced by burning a fuel in the presence of insufficient air to support complete combustion. Advantageously, such products of incomplete combustion may be produced during that part of the heating portion of the cycle during which a fuel is burned to provide hot combustion products for passage through the catalyst zone. On the other hand, particularly in the case of reforming hydrocarbons, a portion or all of the oxidizable gas may be provided just prior to the reforming step when the first portions of the hydrocarbon reactant, contacts the catalyst zone. For example, when the hydrocarbon reactant is admitted to the catalyst zone in preparation for the reforming portion of the cycle, the first portions of such hydrocarbon reactant may be relied upon to reduce the nickel oxide with the simultaneous combustion of the hydrocarbon. In this case, although hydrocarbon is admitted to the catalyst zone, it may be that at least a portion thereof is broken down, possibly by virtue of unoxidized catalyst, into hydrogen and carbon monoxide which in turn reduce the oxidized catalyst.

Since the procedure is cyclic involving an exothermic heating stage and an endothermic reaction stage, the total heat storage per cycle must be substantially balanced with the heat utilized per cycle. The heat utilized per cycle during reforming of hydrocarbons is directly related to the amount of hydrocarbon reformed to hydrogen and carbon monoxide. Thus, if the reformation taking place during the reforming portion of the cycle is insufficient substantially to balance the heat stored in the catalyst zone per cycle, the temperature of the catalyst after a series of cycles will become excessive leading to its sintering and ultimate destruction. Accordingly, with regard to the broader aspects of the process, as applied to the reforming of hydrocarbons, the amount of free oxygen passed into the catalyst zone is controlled in relation to the amount of hydrogen and carbon monoxide produced during reforming so as to maintain temperatures in the catalyst zone at below the sintering temperature of the catalyst. The temperature conditions maintained in the catalyst zone have been set forth previously herein, and the maximum temperatures stated are a measure of the maximum amount of oxygen that may be passed through the catalyst zone per cycle.

With respect to the minimum amount of free oxygen that may be passed to the catalyst zone per cycle, the oxidation-reduction-combustion sequence, as stated, decreases the temperature differential between the entrance and exit portions of the catalyst zone normally obtained when oxygen-free heating gases alone are relied upon to heat the catalyst zone; and it has been found that substantial improvements are obtained in accordance with the process when relatively small amounts of free oxygen are employed so as to reduce the difference between the mean temperature in the exit portion of the catalyst zone and the mean temperature in the entrance portion of the catalyst zone, at the end of the heating period of the cycle, to about 475° F. or less. In reforming hydrocarbons, if the proportion of oxygen to hydrogen and carbon monoxide produced is increased, the temperature differential is further reduced, until for all practical purposes, it is substantially eliminated, that is, until the means temperatures in the exit and entrance portions of the catalyst zone are substantially equal. In some cases, the mean temperature in the exit portion of the catalyst zone may even exceed that in the entrance portion.

The foregoing control of the amount of free oxygen employed has been expressed in terms of mean temperature difference between the exit and entrance portions of the catalyst zone since such is readily measurable. Quantitatively, in the case of hydrocarbon reformation, the amount of free oxygen passed into the catalyst zone per cycle should not exceed about 180 cubic feet per thousand cubic feet of hydrogen plus carbon monoxide produced during the reforming portion of the cycle. While amounts of free oxygen as low as about 15 cubic feet per thousand cubic feet of hydrogen plus carbon monoxide may be used, particularly advantageous results are obtained when the amount of free oxygen employed per cycle is between about 50 and about 100 cubic feet per thousand cubic feet of hydrogen and carbon monoxide produced.

The amount of oxidizable gas passed through the oxidized nickel catalyst zone should be that sufficient to reduce the nickel oxide to elemental form. Thus, the exact amount of oxidizable gases per cycle will depend upon the amount of nickel oxidized and hence upon the amount of free oxygen per cycle previously passed into the catalyst zone. Amounts of oxidizable gases in excess of that required for reduction of the oxidized nickel may be passed through the catalyst zone although no advantage is obtained by passing amounts of oxidizable gases substantially in excess of that required for reduction of the nickel oxide. In the event the oxidizable gases comprise hydrocarbons, amounts in excess of that required for reduction of the catalyst will become reformed in the catalyst and the reformed products may be directed to gas recovery equipment.

As stated, a portion of the required heat in the catalyst zone is supplied by passing hot gases through the catalyst zone and a portion is supplied by the above-described oxidation-reduction-combustion sequence. While the exact proportions of heat supplied to the catalyst by the two means may vary widely depending upon other factors which will occur to those skilled in the art, in general between about 10 and about 50% of the heat stored in the catalyst zone will be supplied by the oxidation of the catalyst as described. Optimum results have been obtained when from about 15 to about 30% of the heat has been so supplied, the remainder being supplied by the sensible heat of hot gases passing through the catalyst zone.

Following the heating of the catalyst zone to the desired temperature, including the described oxidation-reduction-combustion sequence, the endothermic portion of the cycle is commenced by passing the reactants into the catalyst zone. Where a hydrocarbon is to be reformed into a combustible gas comprising hydrogen and carbon monoxide, the reactants will comprise hydrocarbon in the gaseous state and steam. In the catalyst zone a portion of the hydrocarbon reacts catalytically with the steam to provide hydrogen and carbon monoxide. Carbon dioxide may also be formed, particularly when air is employed during reforming. When air is employed, nitrogen will also appear in the product gas. When incomplete reforming is desired, variable amounts of gaseous hydrocarbons will also be present in a product gas. Substantially complete reforming can also be achieved particularly at the higher temperatures mentioned, and this is desired when a product gas low in hydrocarbons such as ammonia synthesis gas, is sought.

The hydrocarbon material reformed in the gas-generating portion of the cycle may comprise normally gaseous hydrocarbon material such, for example, as methane, ethane and propane or butane and ash-free heavier hydrocarbon distillates such as gasoline and gas oil. Corresponding unsaturated hydrocarbons may be present in any desired concentration, such, for example, as ethylene, propylene, butylene, and the like. When normally liquid hydrocarbons are employed, appropriate vaporizing means will be relied upon to convert the hydrocarbon to the gaseous state. Natural gas, which is primarily methane, and refinery oil gas, which is primarily methane and ethylene, are among the hydrocarbon materials which may be employed.

With respect to the fuel employed during the heat storage portion of the cycle, it may be any fluid—that is, gaseous or liquid—combustible. Hydrocarbons such as those mentioned above, and especially natural gas, are particularly satisfactory although gaseous fuel not rich in hydrocarbon, such as water gas, producer gas, oil gas, and the like may also be used. Ash free liquid hydrocarbons, such as fuel oil, gas oil, gasoline, kerosene, tar, and the like may be employed if desired. In the event a liquid fuel is employed, conventional spraying or other vaporizing means may be utilized to facilitate combustion.

The proportion of steam to hydrocarbon reactant employed during the reforming portion of the cycle generally runs between about .8 mol and about 5 mols, preferably between about 1.5 and about 2.5 mols, of steam for each mol of carbon in the hydrocarbon reactant, the exact amount of steam used depending upon whether or not air is also used during the reforming portion of the cycle. When air is used the proportion of steam to hydrocarbon required may be lower than when air is not employed.

Some air preferably is employed during the reforming portion of the cycle. The amount of air so employed will be generally less than about 2 mols thereof per mol of carbon in the hydrocarbon reactant and in most cases will be less than about 1 mol thereof per mol of carbon in the reactant. Preferably, the amount of air employed during the reforming portion of the cycle is between about .1 and about .6 mol thereof per mol of carbon in the hydrocarbon reactant.

While the foregoing description has dealt with a catalyst zone, it will be realized that any number of catalyst zones—or even complete gas-making sets or units coordinated to operate together and each containing a catalyst zone—may be employed.

The present invention will be more readily understood from a consideration of the following examples which are given for the purpose of illustration only and are not intended to limit the scope of the invention in any way:

*Example I*

Spheres approximately ½ inch in diameter of alumina are repeatedly impregnated with, per cubic foot of spheres, a solution, at 190° F., prepared by dissolving 100 lbs. of commercial nickelous nitrate hexahydrate in 10 gallons of water, and dried at 250–400° F. until the average concentration of nickel in the catalyst is approximately 5%, by weight, based on the weight of the alumina plus nickel. The nickel-impregnated spheres are then alternately heated to 2000° F. with hot combustion products containing excess air and cooled to 1900° F. with plain air over a period of about 24 hours. During the heating of the catalyst to 2000° F. the air rate is 35–50 cubic feet per minute per cubic foot of catalyst spheres and, during the cooling to 1900° F., 25 cubic feet per minute per cubic foot of catalyst spheres.

The catalyst spheres now containing an outer peripheral shell consisting essentially of alumina particles coated with nickel spinel, are then impregnated with a solution of nickelous nitrate as described in the foregoing paragraph, at 190° F., until most of the air bubbles are expelled from the pores of the spheres. The spheres are allowed to stand in the solution and cool down overnight, and the solution is drained off from the bottom. The spheres are then heated for 2 hours at 250° F. After cooling, the spheres are again soaked in the stated nickelous nitrate solution overnight after having heated the solution to 190° F. The re-impregnated spheres are again dried at 2 hours at 250° F., and the procedure is repeated a third time in order to insure a concentration of 5% active nickel in the outer 1/16 inch periphery of the spheres.

The catalyst spheres are then heated to 1600° F. to decompose the nitrates and to leave a film of nickel oxide on the nickel spinel-coated alumina particles on the outer periphery shell of the spheres.

*Example II*

Catalyst as prepared according to Example I is made into a catalyst bed 50–60″ deep and about 10 feet in diameter. A two minute cycle is employed in which 42% of the time is made up of "blow" in which hot combustion products are passed through the catalyst bed and in which 35% is gas making "run" during which the product gas is sent to gas-recovery equipment. Following the "blow," there is an air purge amounting to 4%, a steam purge amounting to 6% and a brief period, amounting to 2%, when the hydrocarbon reactant and steam are admitted, before the "run" proper, but the gas is not diverted to the recovery equipment. Following the "run," there is a steam purge amounting to 6%, an air purge amounting to 1% and a brief period, amounting to 4%, when fuel and air are burned, before the "blow" proper, but the gases are directed to the gas recovery equipment.

The results are compared with those obtained using a conventional nickel catalyst (5% nickel on ½ inch alumina spheres).

|  | Ex. I Catalyst | Conv. Catalyst |
|---|---|---|
| 1. Free nickel concentration on 1/16 of periphery, percent | 5 | 5 |
| 2. Capacity of unit (CO+H₂) after 2,500 hrs. of operation (thousand ft.³/day) | 5,600 | 2,800 |
| 3. Fuel and hydrocarbon reactant | (¹) | (¹) |
| 4. Catalyst temp. (avg. over cycle), °F | 1,650 | ² 1,750 |
| 5. Waste gas analyses (wet basis), calc.: |  |  |
| H₂O, percent | 14.53 | 14.53 |
| CO₂, percent | 7.90 | 7.90 |
| O₂, percent | 4.27 | 4.27 |
| N₂, percent | 73.30 | 73.30 |
| 6. Total free oxygen during blow and air purges (ft.³/cycle) | 632 | 632 |
| 7. H₂+CO (ft.³/cycle) | 9,660 | 4,840 |
| 8. O₂ per thousand ft.³ H₂+CO (ft.³) | 65.4 | 130.8 |
| 9. Total air (ft.³/cycle) | 14,300 | 14,300 |
| 10. Total air per thousand ft.³ of H₂+CO (ft.³) | 1,480 | 2,960 |
| 11. Product gas analyses: |  |  |
| CO₂, percent | 4.0 | 7.8 |
| O₂, percent | 0.4 | 0.4 |
| CO, percent | 20.6 | 14.4 |
| CH₄, percent | 4.8 | 13.5 |
| H₂, percent | 64.6 | 59.9 |
| N₂, percent | 5.0 | 5.0 |

¹ Natural gas.

² This increase in temperature for the conventional catalyst occurs gradually over the 2,500 hours due to the gradual reduction in activity of the catalyst. This reduction in activity reduces the endothermic heat removed from the catalyst bed each cycle and results in a temperature increase.

Considerable modification is possible in the selection of materials and reactants used and in the particular procedures and techniques employed without departing from the scope of the present invention.

What is claimed is:

1. A nickel-containing catalyst which consists essentially of an alumina body in which the outer periphery at least to a depth of about 1/32–1/16 of an inch consists essentially of particles at least the surfaces of which consist of nickel spinel, said particles additionally having thereon a film of catalytically active material selected from the group consisting of nickel and nickel oxide; said catalyst having been prepared by heating a nickel-impregnated alumina body to a temperature of at least 1900° F. in an oxygen containing atmosphere until at least the surfaces of the alumina particles in the outer periphery of said body to a depth of 1/32–1/16 of an inch have been converted to nickel spinel, and thereafter impregnating said body with nickel salt and decomposing said salt to provide, on said nickel spinel, a film of catalytically active material selected from the group consisting of nickel and nickel oxide.

2. The catalyst of claim 1 wherein the concentration of catalytically active material is equivalent to between about 2 and about 15%, by weight, of nickel.

3. The catalyst of claim 2 wherein the concentration of catalytically active material is equivalent to between about 5 and about 10%, by weight, of nickel.

4. The catalyst of claim 1 wherein the porosity is between about 25 and about 60%.

5. The catalyst of claim 4 wherein the porosity is between about 30 and about 45%.

6. The catalyst of claim 1 wherein said particles in the outer periphery of said body contain, internally, unreacted alumina and a surface of nickel spinel.

7. The method of making a catalyst which comprises heating a nickel-impregnated alumina body to a temperature of at least 1900° F. in an oxygen-containing atmosphere until at least the surfaces of the alumina particles in the outer periphery of said body to a depth of 1/32–1/16 of an inch have been converted to nickel spinel, and thereafter impregnating said body with nickel salt and decomposing said salt to provide, on said nickel spinel, a film of catalytically active material selected from the group consisting of nickel and nickel oxide.

(References on following page)

References Cited

UNITED STATES PATENTS

| | | | |
|---|---|---|---|
| 1,943,821 | 1/1934 | Hanks | 252—466 |
| 2,592,016 | 4/1952 | Engel | 252—466 |
| 2,606,159 | 8/1952 | Owen | 252—466 |
| 2,946,743 | 7/1960 | Moy et al. | 252—466 |
| 3,186,957 | 6/1965 | Stiles | 252—466 |
| 3,207,700 | 6/1965 | Saffer | 252—463 |

FOREIGN PATENTS 914,423    1/1963    Great Britain.

DANIEL E. WYMAN, *Primary Examiner.*

PATRICK P. GARVIN, *Examiner.*

P. E. KONOPKA, *Assistant Examiner.*